United States Patent
McCormick

(10) Patent No.: US 12,250,212 B2
(45) Date of Patent: *Mar. 11, 2025

(54) COMPUTER USER CREDENTIALING AND VERIFICATION SYSTEM

(71) Applicant: Cigna Intellectual Property, Inc., Wilmington, DE (US)

(72) Inventor: Jeffrey R. McCormick, Cheshire, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,300

(22) Filed: Sep. 18, 2023

(65) Prior Publication Data

US 2024/0007458 A1    Jan. 4, 2024

Related U.S. Application Data

(63) Continuation of application No. 16/731,557, filed on Dec. 31, 2019, now Pat. No. 11,770,374.

(51) Int. Cl.
*G06F 16/00* (2019.01)
*G06F 16/215* (2019.01)
(Continued)

(52) U.S. Cl.
CPC .......... *H04L 63/083* (2013.01); *G06F 16/215* (2019.01); *G06F 16/2379* (2019.01); *G06F 16/2457* (2019.01); *G06N 5/027* (2013.01)

(58) Field of Classification Search
None
See application file for complete search history.

(56) References Cited

U.S. PATENT DOCUMENTS 7,529,682 B2    5/2009   Geller
7,587,611 B2    9/2009   Johnson
(Continued)

FOREIGN PATENT DOCUMENTS

CA           3027799 C       8/2019
WO       2009070430 A2       6/2009

*Primary Examiner* — Bai D Vu
(74) *Attorney, Agent, or Firm* — Miller Johnson

(57) ABSTRACT

A computer system includes memory hardware configured to store computer-executable instructions and processor hardware configured to execute instructions. The instructions include receiving, from a user device, a user verification request. The user verification request includes user identity credentials, a login context describing a login event, and a request for access to a computer system object. The instructions include determining whether the user identity credentials are verified. The instructions include, in response to determining that the user identity credentials are verified, requesting a user token based on the user identity credentials and the login context. The user token specifies entitlements associated with the user identity credentials. The instructions include determining whether the user token specifies entitlements sufficient to access the computer system object. The instructions include, in response to determining that the user token specifies entitlements sufficient to access the computer system object, permitting access to the computer system object.

17 Claims, 11 Drawing Sheets

(51) Int. Cl.
  *G06F 16/23* (2019.01)
  *G06F 16/2457* (2019.01)
  *G06N 5/02* (2023.01)
  *H04L 9/40* (2022.01)

(56) References Cited

U.S. PATENT DOCUMENTS

| | | |
|---|---|---|
| 8,336,091 B2 | 12/2012 | Wong |
| 8,341,427 B2 | 12/2012 | Auradkar |
| 8,495,382 B2 | 7/2013 | Johnson |
| 8,505,078 B2 | 8/2013 | Hohlfeld |
| 8,549,584 B2 | 10/2013 | Singh |
| 8,769,704 B2 | 7/2014 | Peddada |
| 8,800,003 B2 | 8/2014 | Guo |
| 9,178,866 B2 | 11/2015 | Brezinski |
| 9,300,660 B1 | 3/2016 | Borowiec |
| 9,954,867 B1 | 4/2018 | Johansson |
| 2006/0224590 A1 | 10/2006 | Boozer |
| 2007/0028117 A1 | 2/2007 | Wong |
| 2010/0005314 A1 | 1/2010 | Johnson |
| 2011/0231940 A1* | 9/2011 | Perumal ............ G06F 21/335 726/28 |
| 2012/0023556 A1* | 1/2012 | Schultz ............ G06F 21/41 726/8 |
| 2014/0095629 A1 | 4/2014 | Brown |
| 2015/0143106 A1 | 5/2015 | Wentker |
| 2016/0285911 A1 | 9/2016 | Goldman |
| 2016/0352753 A1 | 12/2016 | Roth |
| 2017/0223001 A1 | 8/2017 | Haddad |
| 2017/0359356 A1 | 12/2017 | Brandwine |
| 2018/0004970 A1 | 1/2018 | Arumugam |
| 2018/0063110 A1 | 3/2018 | Kiryazov |
| 2020/0233949 A1 | 7/2020 | Xia |
| 2020/0329066 A1 | 10/2020 | Kirti |
| 2020/0357214 A1 | 11/2020 | Harwell |
| 2022/0086191 A1 | 3/2022 | Tipton |

* cited by examiner

1104

```
{
  "Object": "User Token"
  ,"CreateDate": "20XX-03-15T10:37:22Z"
  ,"User": "Art Vandelay"
  ,"Entitlements":
  [
    {
      "EntitlementName": "Claim Production"
      ,"QualitySet":
      [
        {
          "QualitySetName": "Claim Production"
          ,"Qualities":
          [
            { "QualityName":"Business Capability", "QualityValue":"Claim Processing" }
            ,{ "QualityName":"Environment",          "QualityValue":"Production" }
            ,{ "QualityName":"Location",             "QualityValue":"Belgium" }
            ,{ "QualityName":"Data Classification",  "QualityValue":"PII" }
          ]
        }
      ]
      ,"Role":
      { "RoleName":"Claim Processor"
        ,"EffectiveDate": "20XX-06-01T00: 00:00Z"
        ,"ExpirationDate":"20XX-01-01T24:00:00Z"
        ,"BusinessFunctions":
        [
          { "BusinessFunctionName":"View Claim Information" }
          ,{ "BusinessFunctionName":"Process Claims" }
          ,{ "BusinessFunctionName":"Process Claim Work Queue" }
        ]
      }
    }
  ]
}
```

FIG. 11

COMPUTER USER CREDENTIALING AND VERIFICATION SYSTEM

CROSS-REFERENCE TO RELATED APPLICATIONS

This application is a continuation of U.S. patent application Ser. No. 16/731,557 filed Dec. 31, 2019, the entire disclosure of which is incorporated by reference.

FIELD

The present disclosure relates to management of computer user credentialing and verification, including defined roles for access to computer system functions.

BACKGROUND

Existing computer access privileges are typically managed and verified using Identity and Access Management (IAM) and authorization processes. IAM processes control user authentication and access to computer systems, to ensure that the proper users in an enterprise have appropriate computer system access. Authorization processes are performed at each computer in the system, and verify an authenticated user's access rules, to either grant or refuse access to specific computer system objects, including computer programs, files, services, data and application features.

However, these existing approaches are limited in a number of ways. Notably, a computer system-centric approach presents disadvantages when managing users and their corresponding rights. Rights are not explicitly defined in terms of a user's eligible functions in the computer system.

Further, computer system and object views of user privileges do not provide a clear view of user rights, such as the functions that may be performed by users. This presents a number of disadvantages when an enterprise is tasked with defining, assigning, managing and verifying a user's entitlements in function terms. Computer system and object approaches require technology experts to understand user rights, rather than system administrators. This can lead to misinterpretation of privileges and may result in users being granted more privileges than are required to perform their corresponding functions.

In addition, decentralized management creates complexity and can lead to inconsistency and security risks. With decentralized management, the number of administrators and verification processes can be equal to the total number of computer systems that implement the privileges. If one or more computer systems fail to remove user privileges in response to changes to user rights, security vulnerabilities may be exposed. Also, user verification must be performed at each computer system at runtime. Unauthorized users that do not have privileges to perform requested actions are identified and denied access at each computer system, thereby taxing individual computer system technical resources.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware and a processor. The memory hardware is configured to store a credential database and computer-executable instructions, the credential database including multiple user profiles and multiple credentials, each credential specifying one or more function privileges for each user profile that has been granted the credential. The instructions include receiving a specified one of the multiple credentials and a specified one of the multiple user profiles, granting the specified one of the multiple credentials to the specified one of the multiple user profiles, receiving a verification request including a user profile identifier, contextual qualities and a requested function, retrieving the credential granted to the user profile associated with the user profile identifier, determining whether the requested function is included in the one or more function privileges specified by the retrieved credential, and permitting the verification request or denying the verification request according to the determination of whether the requested function is included in the one or more function privileges specified by the retrieved credential.

In other features, the credential database comprises an entitlement database and each credential comprises an entitlement specifying one or more function privileges for each user profile that has been granted the entitlement. In other features, the entitlement database includes multiple user tokens each associated with one of the multiple users, and each user token specifies one or more of the multiple entitlements granted to the user profile associated with the user token.

In other features, the computer system includes a management interface in communication with the entitlement database. The specified one of the multiple entitlements and the specified one of the multiple user profiles are received from an administrator via the management interface. In other features, the instructions include modifying one of the entitlements granted to one of the user profiles in response to a modification instruction received from the administrator via the management interface, and deleting one of the multiple user profiles in response to a deletion instruction received from the administrator via the management interface. In other features, the computer system includes an audit trail module. The instructions include logging, via the audit trail module, at least one of the verification request, the granting of the specified one of the multiple entitlements to the specified one of the multiple user profiles, the determination of whether the requested function is included in the one or more function privileges specified by the retrieved entitlement, a query to the entitlement database, and creation of a new entitlement in the entitlement database.

In other features, the computer system includes a query tool in communication with the entitlement database. The instructions include receiving one or more query parameters from an analytics actor via the query tool, searching the entitlement database for user profile information corresponding to the one or more query parameters, and returning results of the search to the query tool. In other features, the computer system includes an application user interface (UI), and an application programming interface (API) in communication between the application user interface and the entitlement database. The API receives the verification request from a human user or a computer system user via the application user interface, and returns a result of the verification request to the application user interface.

In other features, the computer system includes a rules engine. The rules engine determines whether the requested function is included in the one or more function privileges specified by the retrieved entitlement by comparing the contextual qualities of the verification request to contextual qualities specified by the retrieved entitlement. In other features, the instructions include storing multiple quality sets in the entitlement database, each quality set including a unique combination of multiple qualities, storing multiple business functions, each business function including one of the function privileges specified by the multiple entitlements, generating multiple roles, each role including one or more of the stored multiple business functions, and for each of the multiple user profiles, assigning one or more of the generated roles to the user profile.

In other features, the instructions include associating each of the multiple entitlements with one or more of the multiple roles and associating each of the entitlements with one of the stored multiple quality sets. In other features, the entitlement database stores entitlement data, user data, quality set data, quality data, role data and business function data.

A method of computer user credentialing and verification includes receiving a specified one of the multiple credentials and a specified one of the multiple user profiles, granting the specified one of the multiple credentials to the specified one of the multiple user profiles, receiving a verification request including a user profile identifier and a requested function, retrieving the credential granted to the user profile associated with the user profile identifier, determining whether the requested function is included in the one or more function privileges specified by the retrieved credential, and permitting the verification request or denying the verification request according to the determination of whether the requested function is included in the one or more function privileges specified by the retrieved credential.

In other features, the credential database comprises an entitlement database and each credential comprises an entitlement specifying one or more function privileges for each user profile that has been granted the entitlement. In other features, the entitlement database includes multiple user tokens each associated with one of the multiple users, and each user token specifies one or more of the multiple entitlements granted to the user profile associated with the user token. In other features, the specified one of the multiple entitlements and the specified one of the multiple user profiles are received from an administrator via a management interface.

In other features, the method includes modifying one of the entitlements granted to one of the user profiles in response to a modification instruction received from the administrator via the management interface. The method includes deleting one of the multiple user profiles in response to a deletion instruction received from the administrator via the management interface. In other features, the method includes logging, via an audit trail module, at least one of the authorization request, granting of the specified one of the multiple entitlements to the specified one of the multiple user profiles, determining whether the requested function is included in the one or more function privileges specified by the retrieved entitlement, a query to the entitlement database, and creation of a new entitlement in the entitlement database.

In other features, the method includes receiving one or more query parameters from an analytics actor via a query tool, searching the entitlement database for user profile information corresponding to the one or more query parameters, and returning results of the search to the query tool. In other features, an application user interface (API) receives the verification request from a human user or a computer system user via the application user interface and returns a result of the verification request to the application user interface.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 11 is an example user token defining user entitlements.

In the drawings, reference numbers may be reused to identify similar and/or identical elements.

DETAILED DESCRIPTION

Figure 1:
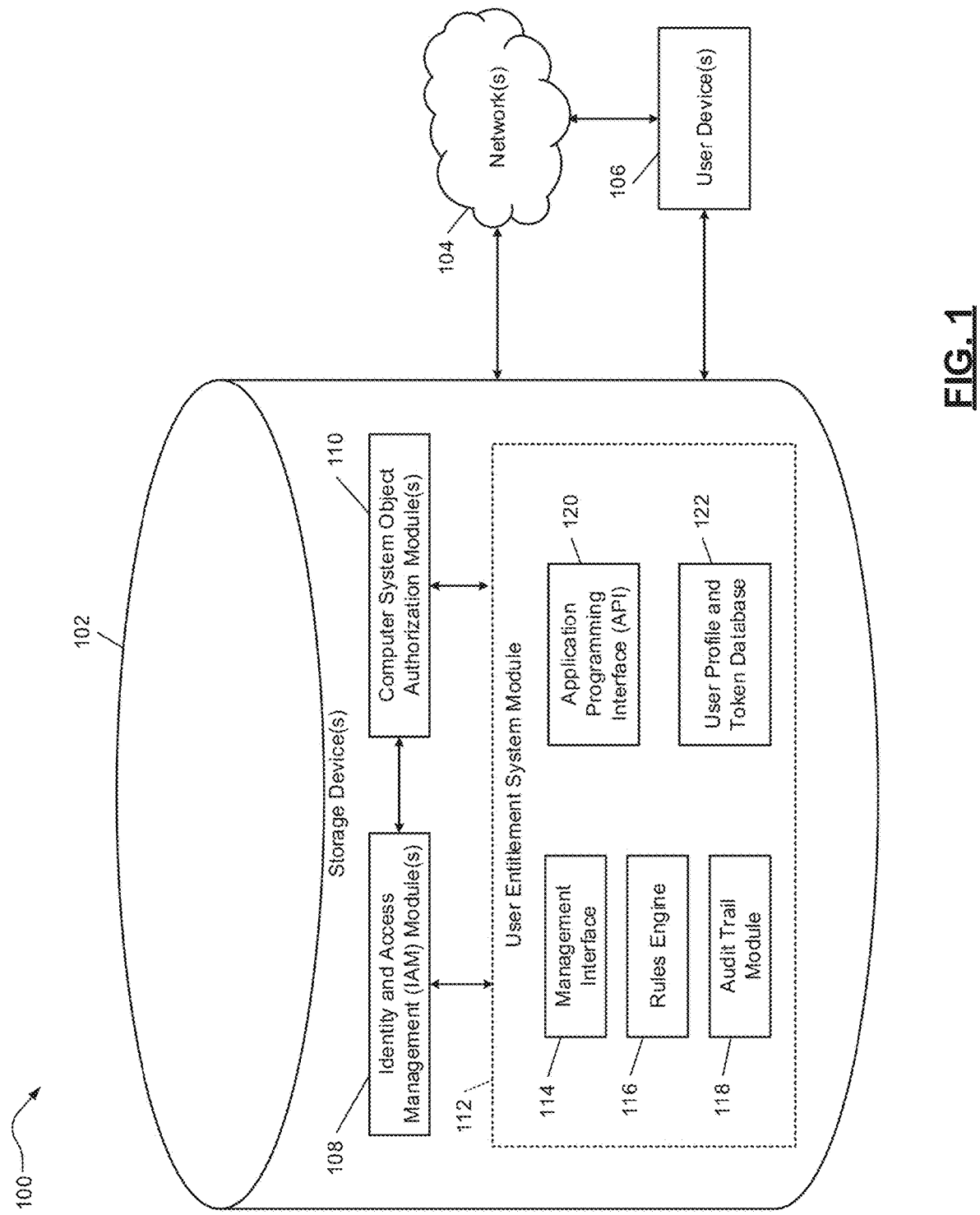
FIG. 1 is a functional block diagram of an example system for managing computer user entitlements for access to computer functions.

Computer access privileges are typically managed and verified using access management processes that control user authentication and access to computer systems to ensure that the proper users in an enterprise have appropriate computer system access. The authorization processes are performed individually at each computer in the system, to either grant or refuse access to specific computer system objects, including computer programs, files, services, data and application features.

However, these existing approaches do not explicitly define a user's rights in terms of a user's eligible functions (e.g., business functions), which inhibits business administrators from understanding user rights, leading to misinterpretations and users being granted more privileges than are required to perform their corresponding business functions.

In addition, decentralized management increases the number of administrators and verification processes according to the number of computer systems that implement the privileges, and may expose security vulnerabilities if one or more computer systems fail to remove user privileges in response to changes to user rights. Also, user verification must be performed at each computer system at runtime. Unauthorized users that do not have privileges to perform requested actions are identified and denied access at each computer system, thereby taxing individual computer system technical resources.

In various implementations, a user entitlement system (UES) grants enterprise occupational rights to users in the form of defined user roles. As used herein, a "user" may refer to a human user profile, a computer system process, or any other suitable actor attempting to access a computer system resource, component, application, etc. The roles define the rights of the user to perform functions (e.g., business functions) within a defined context, and may be used as credentials by computer systems to assist in authorizing access to computer system objects. Once granted, the user's aggregate roles may serve as time-bound credentials that can be verified and published to requesting computer systems at runtime. A set of contextual qualities (e.g., attributes) may be matched to the user profile's defined role(s), in order to qualify the user to perform business function(s) using specified computer system components. The business functions may be flexible, and may include fine-grained business functions, coarse business functions, etc.

A user entitlement system may enhance existing computer systems that use authentication and access authorization processes, by adding additional security using credential verification. In contrast to systems that include only authentication and access authorization processes, incorporation of a user entitlement system may provide a practical application that increases login request processing efficiency (e.g., by reducing wasted computer resources for unauthorized user login attempts, by streamlining subsequent access authorization processes based on successful credential verification, etc.). The user entitlement system may provide numerous technical advantages, including but not limited to providing a business function view of user entitlements, providing a user-centric approach to allow for business and human resource administration of user entitlement management, defining explicit user roles for computer system access in terms of business functions, creating a single source-of-truth and centralized management for entitlements, increasing efficiency and consistency of runtime verification of user entitlements, reducing and/or inhibiting the technical resources that a target computer needs to allocate for verification of unauthorized users, enhanced security protection for the target computer system at an earlier stage in the user authorization request process, etc.

Computer Access Management System

FIG. 1 is a block diagram of an example implementation of a system 100 for managing credential verification for access to computer system resources according to user entitlements, including a storage device 102. While the storage device 102 is generally described as being deployed in a managed computer network system (for example, a company computer network managed by a business administrator, an IT manager, etc.), the storage device 102 and/or components of the storage device 102 may otherwise be deployed (for example, as a standalone computer setup, etc.). The storage device 102 may be a desktop computer, a laptop computer, a tablet, a smartphone, etc.

As shown in FIG. 1, the storage device 102 includes an identity and access management (IAM) module 108, a computer system object authorization module 110, and a user entitlement system (UES) module 112. The IAM module 108, the computer system object authorization module 110, and the user entitlement system module 112 may be located in different physical memories within the storage device 102, such as different random access memory (RAM), read-only memory (ROM), a non-volatile hard disk or flash memory, etc. In some implementations, one or more of the IAM module 108, the computer system object authorization module 110, and the user entitlement system module 112 may be located in the same memory (e.g., in different address ranges of the same memory, etc.).

The IAM module 108 may provide authentication of a user's identity based on identity credentials provided by the user via a user device 106. For example, the user device 106 may receive a password credential, a biometric credential, a two-factor authentication credential, etc., from the user, and the IAM module 108 may authenticate the user's identity based on the received identity credential. The user device 106 may include any suitable device for requesting access to the computer system including the storage device 102, such as a desktop computer, a laptop computer, a tablet, a smartphone, etc. The user device 106 may access the storage device 102 directly, or may access the storage device 102 through one or more networks 104. Example networks may include a wireless network, a local area network (LAN), the Internet, a cellular network, etc.

The computer system object authorization module 110 may allow user access to one or more database tables, one or more procedures, one or more computer system objects or components, etc. The scope of the allowed access may be determined based on authentication of the user's identity via the access management module 108, and user entitlements determined by the user entitlement system module 112, as described further herein.

The user entitlement system module 112 includes a management interface 114, a rules engine 116, an audit trail module 118, an application programming interface (API) 120, and a user profile and token database 122, as described in further detail below. The user entitlement system module 112 may supplement the access management module 108 and the computer system object authorization module 110 to provide enhanced security via credential verification.

Figure 2:
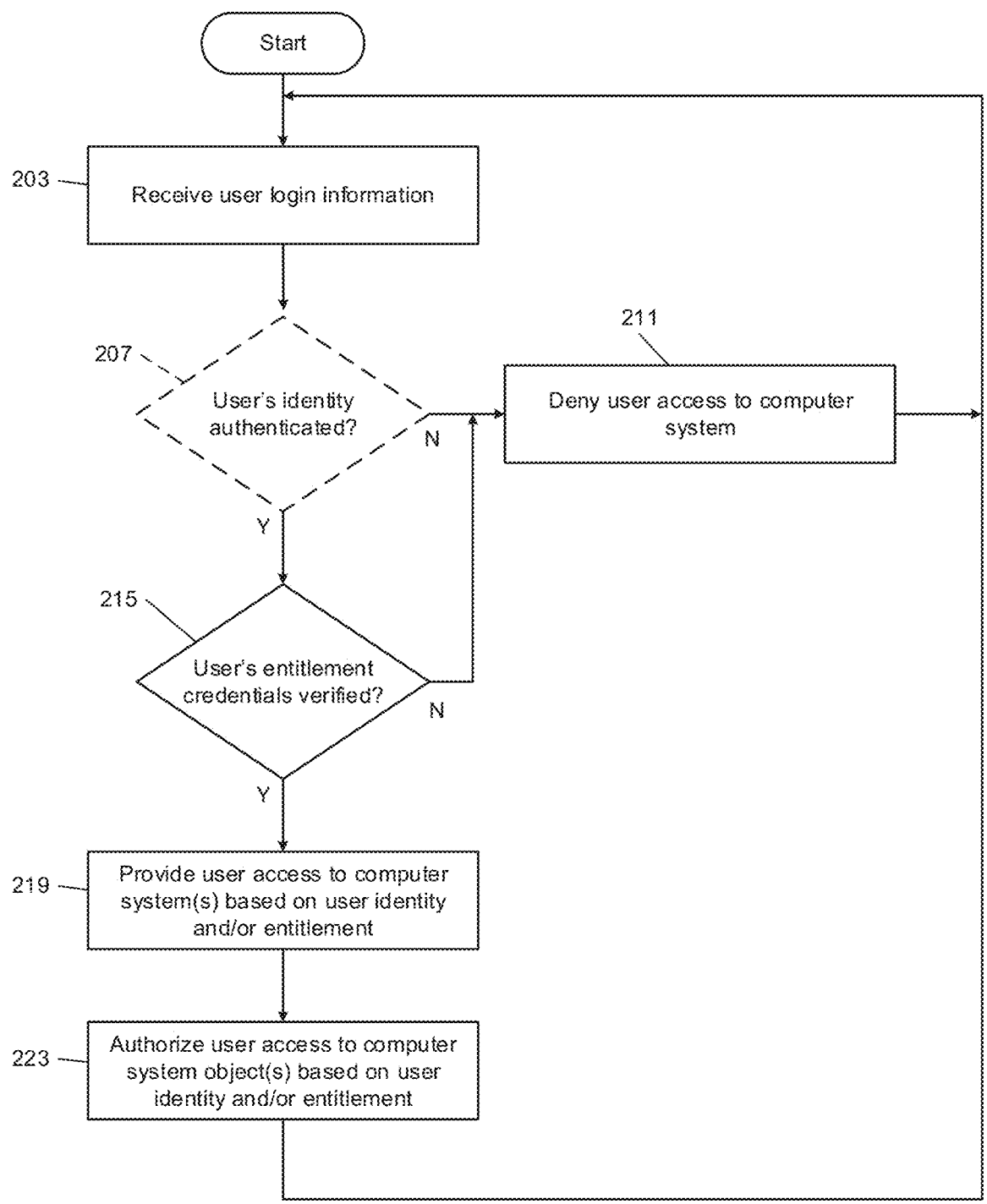
FIG. 2 is a flowchart depicting an example method for providing authentication to a computer system, verification of computer user credentials according to user entitlements, and authorization to computer system objects.

FIG. 2 illustrates an example process for accessing computer system components using the system 100. At 203, control begins by receiving user login information (e.g., identity credentials). The user's identity is authenticated at 207, such as via the IAM module 108. If the user's identity is not authenticated (e.g., the user's identity credentials do not match stored authentication credentials), the user is denied access to the computer system 100 at 211.

If the user's identity is authenticated 207, control proceeds to determine whether the user's entitlement credentials are verified at 215 (e.g., using the user entitlement system module 112). If the user's entitlement credentials are not verified at 215 (e.g., the user entitlement system module 112 determines that the user's entitlement credentials to not match an entitlement to perform a requested function), control proceeds to deny the user access to the computer system 100, at 211. If the user's entitlement credentials are verified at 215, control proceeds to provide the user access to the computer system 100 based on the user's verified identity and/or the user's entitlement privileges, at 219. The user is then authorized to access specified computer system objects based on the user's verified identity and/or the user's entitlement privileges, at 223.

As shown in the example of FIG. 2, the user entitlement verification at 215 occurs after the user authentication at 207, but before the access management at 219 and the individual computer system object authorization at 223. The user authentication at 207 may include a process of authenticating a user's identity, although this step may not be used for guest users. The user entitlement verification at 215 may include verifying a user's credentials to perform business functions based on the user's identity. The access management performed at 219 may include giving a user access to computer system(s) based on their identity, and the authorization performed at 223 may include giving the user access to system objects based on their identity. If the user is determined to lack entitlement at 215, the process may stop early and the access management and authorization steps at 219 and 223 may be avoided, thereby saving computer resources. If the entitlement is verified at 215, then steps 219 and 223 may be completed more quickly based on the verified entitlement.

Shared, centralized entitlement management and verification at 215 facilitates limiting access to computer systems and their objects to qualified users. Additionally, individual computer systems that synchronize user roles with the user entitlement system roles may facilitate more secure computer system and object authorization that is more consistent with the user's business rights (e.g. by limiting user application permissions to a subset of available actions, etc.), as compared to empowering a single proxy user with the authority to perform all actions available to an application in the database.

User Entitlement Management System

Figure 3:
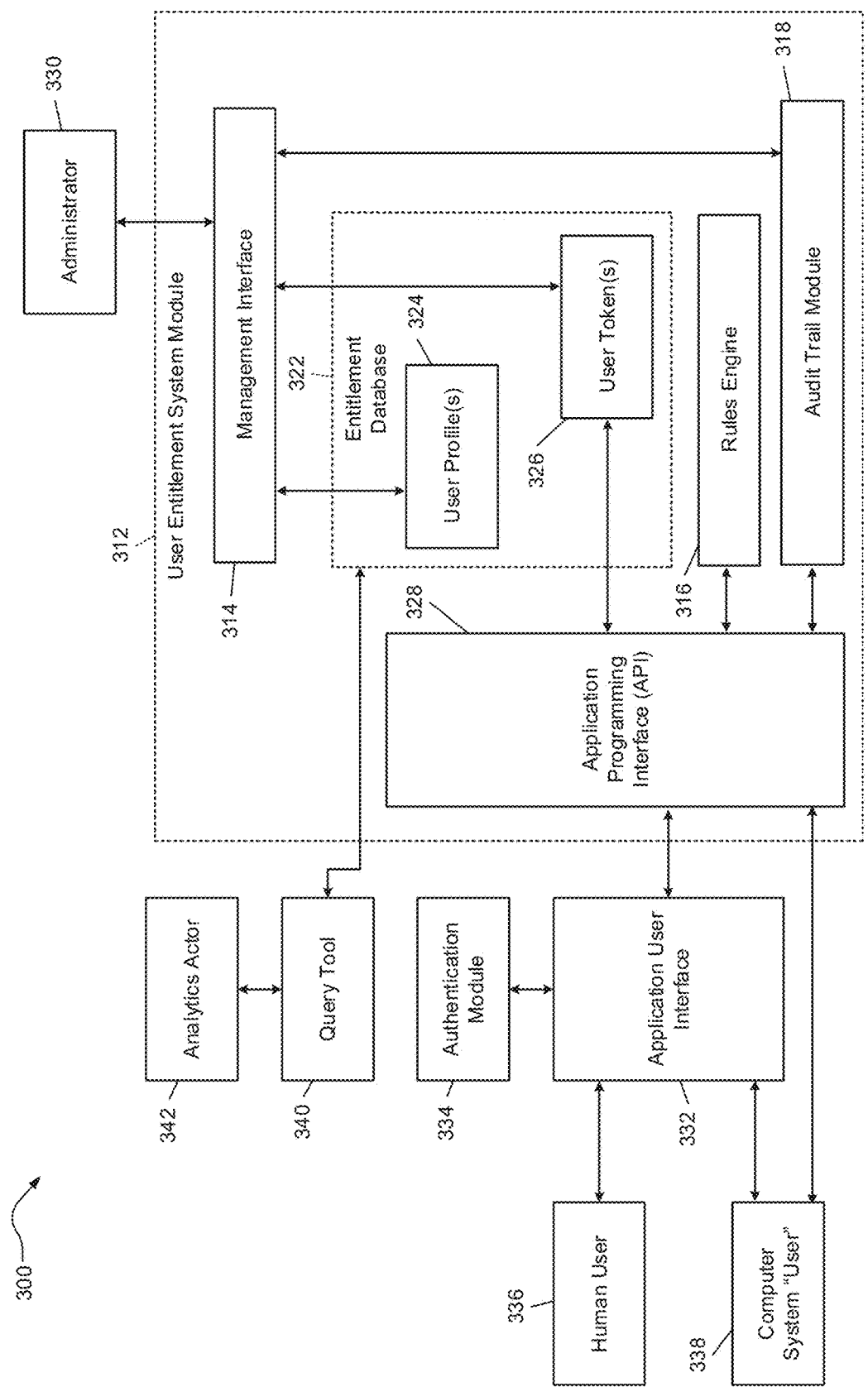
FIG. 3 is a functional block diagram of an example user entitlement management system.

FIG. 3 is a functional block diagram of an example user entitlement management system 300. The system 300 may provide a generic and flexible user-centric entitlement approach for describing in business terms, a collection of business functions and associated user rights. The users of the system 300 may include any suitable actors attempting to request access to the computer system, such as employees, consultants, vendors, volunteers, trainees, customers, other computer system processes, etc. User rights may be referred to as credentials, and can be requested by computer systems at runtime and verified and published by the user entitlement management system 300. The system 300 may be used with any suitable enterprise and entitlement model.

As shown in FIG. 3, the system 300 includes a user entitlement system module 312, which includes a management interface 314 and an entitlement database 322. The management interface 314 may include any suitable application for viewing, creating, updating, removing, etc., entitlement data. An administrator 330 may access the management interface 314 to set up and maintain user entitlements. Example administrators 330 include, but are not limited to, human resource personnel, managers, entitlement system administrators, etc. The administrator 330 may view, create, update and remove entitlement data through the application management interface 314, and the actions may be logged using the audit trail module 318.

The entitlement database 322 may include a modeled persistence of entitlement data, including user profiles 324 and user tokens 326. The entitlement database 322 may be considered as a credential database that stores multiple credentials, where each credential (e.g., entitlement) specifies one or more function privileges for each user profile 324 that has been granted the credential (e.g., entitlement). For example, the user profile 324 may include role-based credentials that grant business functions permissions to users, and the user token 326 may include data that specifies the credentials (e.g., entitlements) of the user profile 324 in a tokenized format. As illustrated further in FIG. 4, entitlements may be defined by a quality set associated with one or more roles and business functions. A quality set may be unique collection of qualities (e.g. attributes) and associated values that represent a viewpoint of a business within the enterprise. An intersection of the qualities may define the scope of the quality set, and therefore define the scope of an entitlement. Example qualities may include, but are not limited to, a business capability, a location, a customer segment, a date/time, a data classification, an environment, an organization, etc. Roles may be defined according to competency, authority, responsibility, etc. and may include one or more expressly stated business functions. Entitlements may use the principle of least privilege (POLP), which may limit access rights for a user to a minimum set of permissions needed to perform the actions requested by the user. The user tokens 326 may be considered as credentials that are used for verification, and may identify entitlements assigned to the user.

For example, the user entitlement system module 312 includes a rule engine 316, an audit trail module 318, and an application programming interface (API) 328. The rules engine 316 includes rules for entitlement verification, and may check whether a user token 326 corresponding to a human user 336 (or a computer system user 338), matches the type of action requested by the user 336 or 338. The rules engine 316 may use runtime contextual qualities (e.g., attributes) for determining the entitlement verification.

The audit trail module 318 includes a record of request (e.g., read and write) events from the management interface 314 and the API 328, query events from the query tool 340, or any other suitable activities performed with the user entitlement system module 312. The API 328 provides an interface for a human user profile 336 and/or a computer system user 338 to request events. For example, the human user profile 336 may use the application user interface 332 to request access to a computer system, and the request may include a type of action that the user 336 wishes to perform. The application user interface 332 transmits the access request to the user entitlement system module 312 via the application programming interface 328. The application user interface 332 may also verify a human user profile 336 or a computer system user 338 based on the received credentials, using the authentication module 334.

The computer system user 338 may also access the user entitlement system module 312 via the application user interface 332 and the API 328. Alternatively, the computer system user 338 may directly interface with the API 328 without using the application user interface 332. For example, the application user interface 332 may include a graphical display that is helpful to the human user 336 to provide credentials for entitlement, while the computer system user 338 may not require any visual, graphical user interface for providing credentials.

The system 300 also includes a query tool 340, which may allow an analytics actor 342 to query information from the entitlement database 322. For example, an actor such as the administrator 330, the human user 336, the computer system user 338, etc., may desire to obtain information about user profiles 324 or user tokens 326, to request logs from the audit trail module 318, etc. The query tool 340 may allow any suitable analytics actor 342 to obtain the data from the entitlement database 322 by submitting analytics queries to the query tool 340, and providing the returned query results to the analytics actor 342. For example, the query tool 340 may be used to determine what rights a specific user has, may be used to find all users that have a specified type of entitlement, may be used to determine all types entitlements that are available for assignment, etc.

Figure 4:
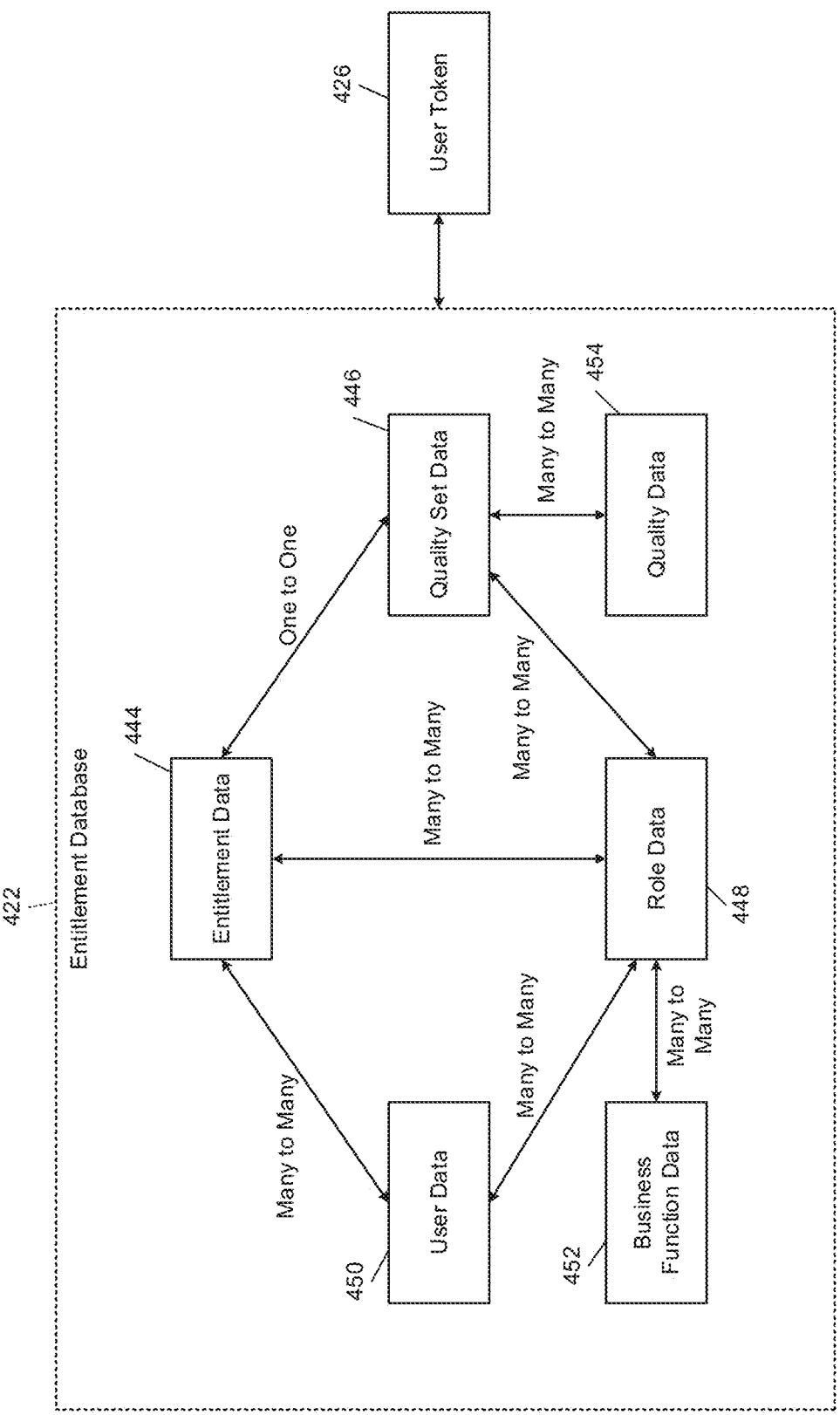
FIG. 4 is a functional block diagram of an example entitlement database model of the entitlement database of FIG. 3.

FIG. 4 illustrates an example entitlement database model 422, which may be considered as a logical entity data model of the entitlement database 322 illustrated in FIG. 3. The entitlement database model 422 represents an organized and structured set of data, and relationships between the different data components that support entitlement administration, verification and reporting.

As shown in FIG. 4, the entitlement database model 422 includes entitlement data 444, quality set data 446, role data 448 and user data 450. The entitlement data 444 may include enterprise occupational rights that can be granted to users. Example entitlement entries in the entitlement data 444 may include multiple roles from the role data 448, or single roles. One example entitlement is an entitlement for claim production, such as an insurance claim, which may include roles such as a claims processor, claim inquiry, a claims supervisor, etc.

The user data 450 represents individual users of the system, which may include human user profiles, computer systems and computer system processes, etc. The user data 450 may have a many to many relationship with the entitlement data 444, because different users can have multiple entitlements, and different entitlements can be applied to multiple users.

The quality set data 446 (e.g., attributes) may refer to characteristics of an entitlement, which may define the scope of the entitlement and its associated privileges and rights. The quality set data 446 includes multiple qualities 454, each identifying a unique collection of one or more qualities from the quality data 454 and associated values for the qualities. For example, a quality set may be a unique collection of qualities and associated values that represent a viewpoint of the business within the enterprise. The intersection of qualities define the scope of the quality set, and therefore the scope of the associated entitlement. Example qualities may include, but are not limited to, a business capability, a location, the customer segment, the date/time, a data classification, environment, and an organization. There is a many to many relationship between the quality data 454 and the quality set data 446, because each quality may be included in different quality sets, and each quality set may include multiple different qualities.

Figure 5:
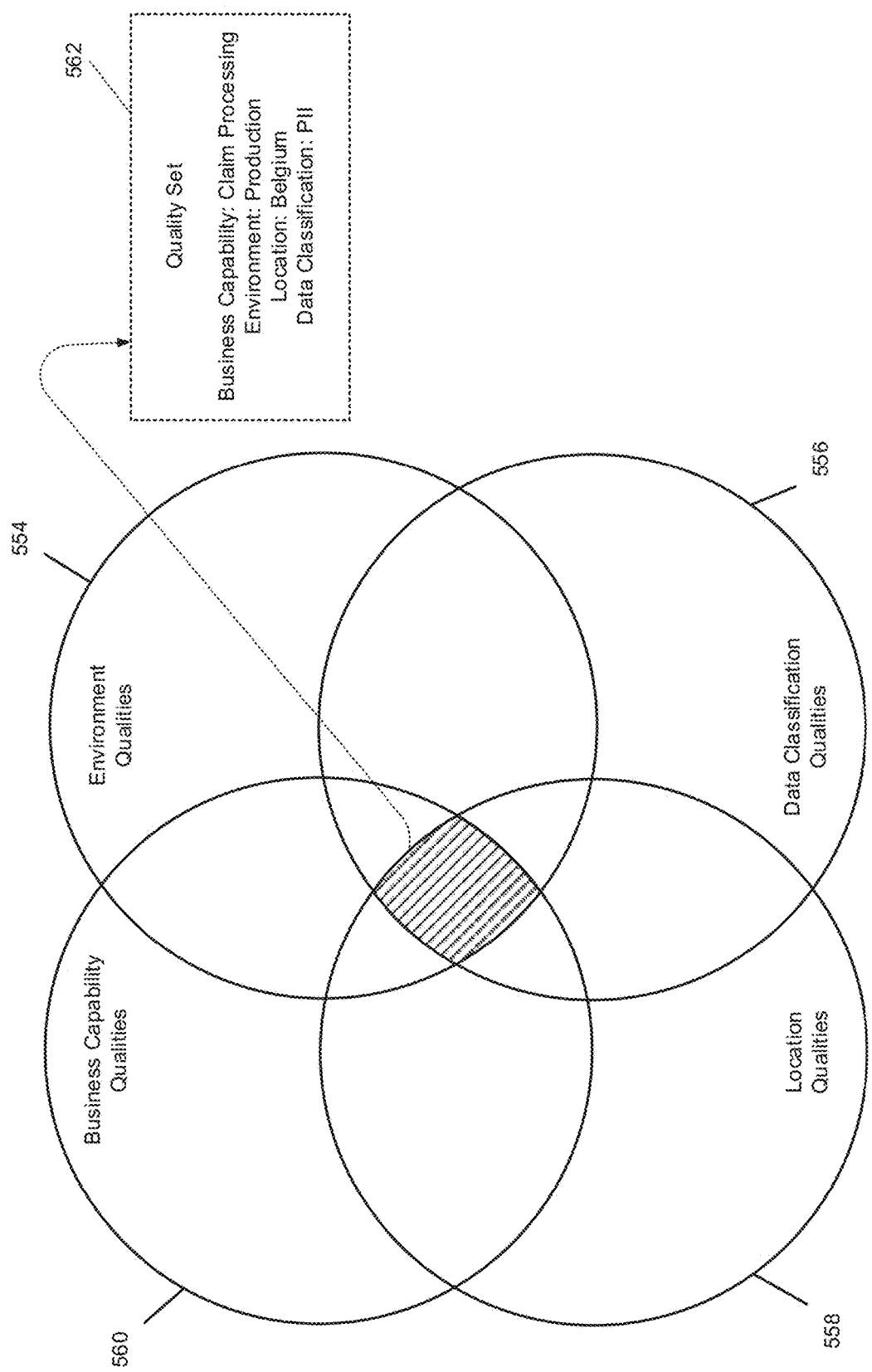
FIG. 5 is a Venn diagram of example quality set relationships in the entitlement database of FIG. 4.

FIG. 5 illustrates a Venn diagram of an example quality set 562 based on four qualities. As shown in FIG. 5, the four qualities are business capability qualities 560, environment qualities 554, data classification qualities 556 and location qualities 558. The quality set 562 covers an intersection of these four qualities where the business capability is specified as claim processing, the environment is specified as production, the location is specified as Belgium, and the data classification is specified as personally identifiable information (PII).

This quality set 562 may be associated with a specific entitlement that grants specified privileges and/or rights to a user located in Belgium that is attempting to access PII data claim using a claim processing capability in a production environment. The rules engine 316 may compare the identity and current quality details (e.g., contextual attributes) received from the user 336 or 338 at runtime, to the quality set information associated with a user token 326, in order to see if the received quality information matches entitlement credentials of the user token 326 associated with the user 336 or 338.

Referring back to FIG. 4, a business function of the business function data 452 may refer to a specified action carried out by a user via the computer system. Each role from the role data 448 designates one or more business functions from the business function data 452. For example, multiple business functions from the business function data 452 may be aggregated into a role, such as a claim processor role. Each role may be time-bound if desired, or may be indefinite. The business function data 452 and the role data 448 have a many to many relationship, because multiple business functions may be grouped in each role, and each business function may be implemented in multiple different roles.

As shown in FIG. 4, there is a many to many relationship between the user data 450 and the role data 448, because each user may have multiple roles, and each role may be assigned to multiple users. There is also a many to many relationship between the role data 448 and entitlement data 444, because each entitlement may include multiple roles, each role may be assigned to multiple entitlements.

There is a one to one relationship between the entitlement data 444 and the quality set data 446, because each entitlement may correspond to a unique quality set. For example, a unique set of qualities and their associated values may be assigned to a specific entitlement, which allows the user to perform specified business functions when the quality set is satisfied. Entitlements may be defined by the quality set and associated with the roles and business functions. The data from the entitlement database 422 may be used to generate a user token 426, which associates user credentials with entitlements from the entitlement data 444, as described further herein.

Entitlement Setup

Figure 6:
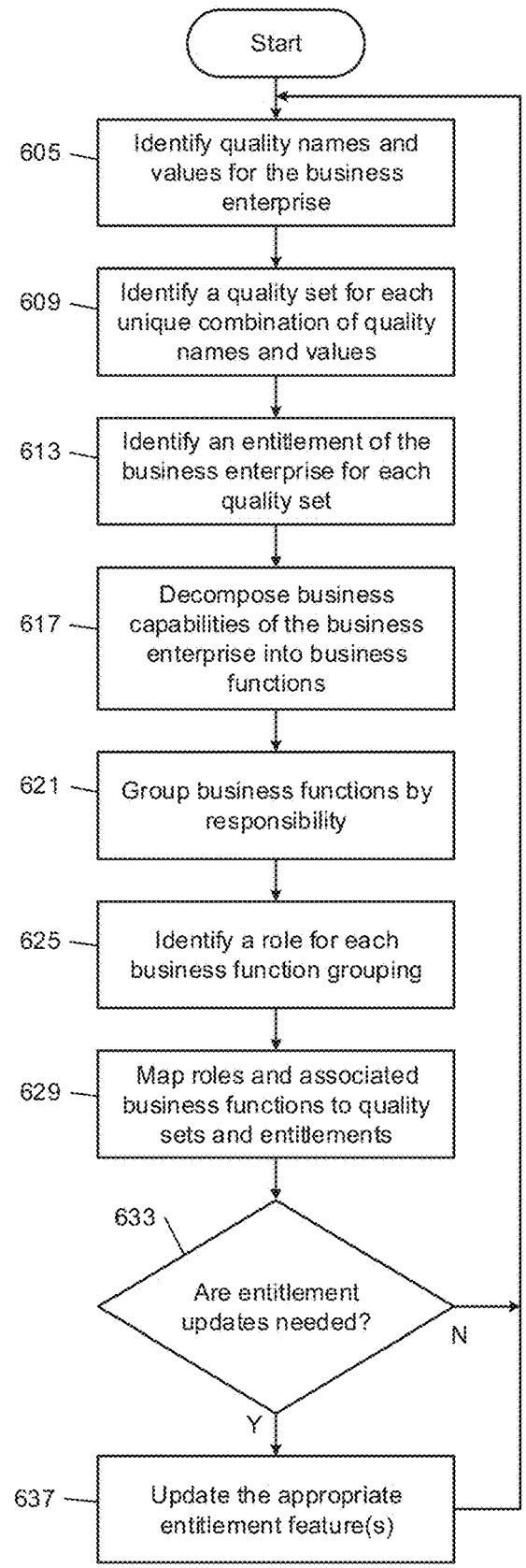
FIG. 6 is a flowchart depicting an example method for setting up entitlements in the system of FIG. 3.

FIG. 6 illustrates an example method for setting up user entitlements. As described above, the administrator 330 may access the user entitlement system module 312 via the management interface 314, to create entitlements, to modify existing entitlements, etc. In the method of FIG. 6, control may identify quality names and values for a business enterprise at 605. For example, control may identify the name of each quality attribute, and possible values or ranges of values for the quality.

Control then proceeds to 609, to identify a quality set for each unique combination of quality names and values. For example, different values for each of the specified qualities may be uniquely combined to create a different quality set corresponding to each unique combination of values (e.g., a unique quality set including the quality values of claim processing, production, Belgium and PII, as shown in the example of FIG. 5).

At 613, control identifies an entitlement of the business enterprise for each quality set. There may be one entitlement associated with each quality set. Control then decomposes the business capabilities of the enterprise into business functions at 617, and groups business functions by responsibility at 621. For example, control may determine the range of functions that may be performed, and then group functions that are likely to be associated with one another or performed together for specified activities.

Control then proceeds to 625 to identify a role for each business function grouping, and maps roles and associated business functions to quality sets and entitlements at 629. The grouped business functions that are likely be performed together or associated with one another can be identified for a specific corresponding role, then the roles may be mapped to the quality sets and entitlements, such as via the example relationships shown in the example entitlement database 422 of FIG. 4.

At 633, control determines whether any entitlement updates are needed. If not, control returns to 605 to identify whether any new quality names and values should be defined for the business enterprise. If control determines that updates are needed at 633, control updates the appropriate entitlement features at 637, before returning to 605 to identify whether any new qualities and values should be added for the business enterprise.

Figure 7:
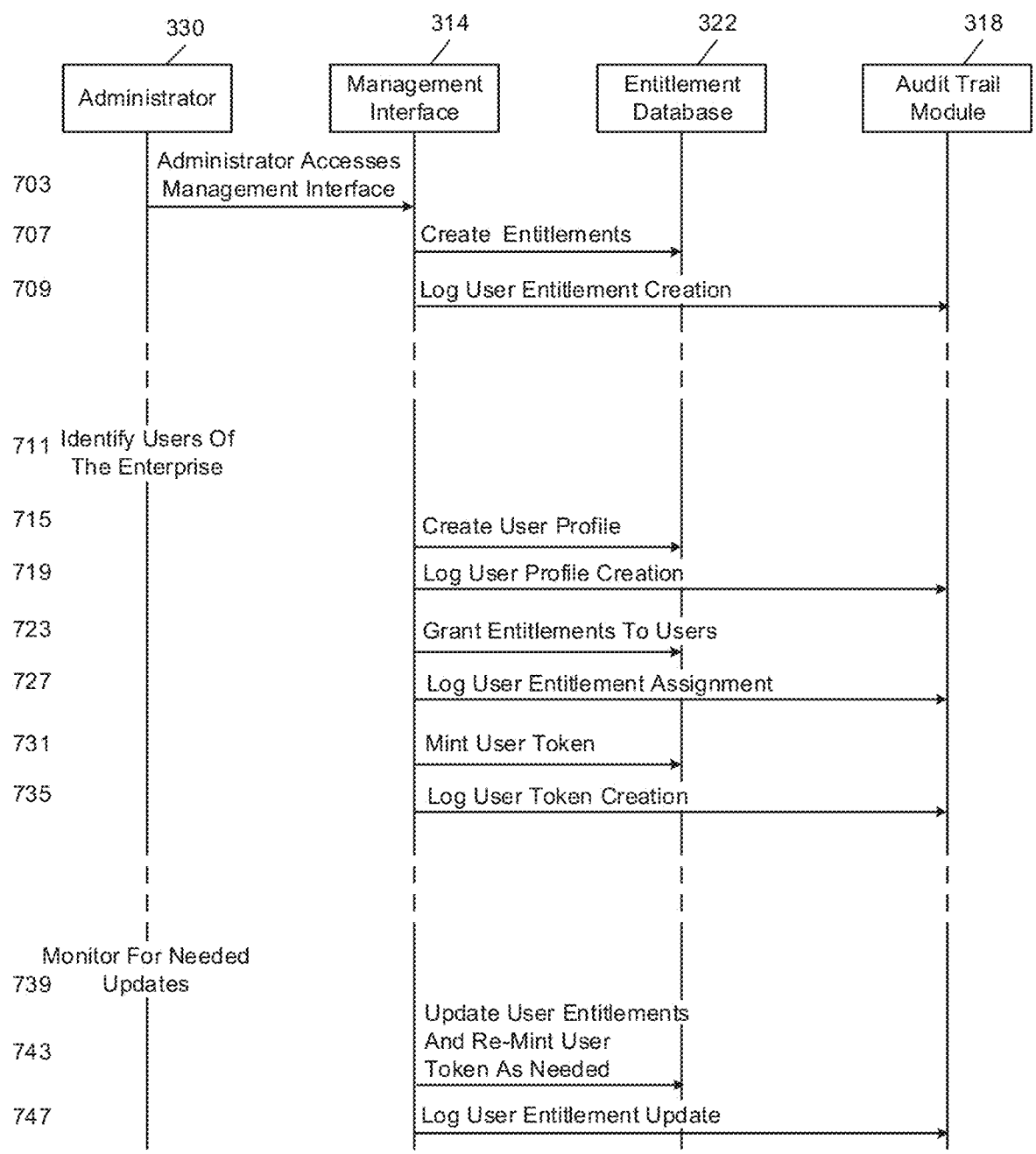
FIG. 7 is a message sequence chart showing example interactions between components of the system of FIG. 3 for setting up entitlements and assigning entitlements to a user.

In FIG. 7, interactions between the administrator 330, the management interface 314, the entitlement database 322 and the audit trail module 318 are illustrated, during the process of setting up the entitlements, as well as the process of assigning created entitlements to users. At line 703, the administrator 330 accesses the management interface 314, and at line 707, the administrator 330 uses the management interface for 314 to create entitlements in the entitlement database 322. For example, the administrator 330 may create entitlements using the process illustrated in FIG. 6. At line 709, the creation of the entitlement is logged via the audit trail module 318.

As described above, the administrator 330 may manage users by viewing, creating, updating and removing users from the user profiles 324 of the entitlement database 322, and the administrator may mint user tokens 326 in the entitlement database 322, with logging via the audit trail module 318. Users may be granted time-bound entitlements to perform business functions in the form of roles. For example, users may be granted a single role for one or more entitlements, may be granted multiple roles, etc. When the user is granted an entitlement, the user is granted the rights within the scope of the entitlement. Entitlements may be minted in the form of a user token 326, which corresponds to a specific user profile 324. The user token 326 represents a point-in-time view of user entitlement roles and associated business functions that are currently in effect and/or will be effective at a future time. The user token 326 may represent the totality of the user's rights, and may be referred to as user credentials.

At line 711, the administrator 330 may identify users of the enterprise. The administrator 330 then uses the management interface 314 to create user profiles, at line 715. The created user profiles may include identity authentication information (IDs) of users of the enterprise. In some implementations, guests may have their own profile and guest user entitlements. After creating a user profile 324 that is stored in the entitlement database 322 at line 715, the management interface 314 may log the user profile creation via the audit trail module 318, at line 719.

At line 723, the administrator 330 may use the management interface 314 to assign specific entitlements for users, which are stored in the entitlement database 322. For example, the administrator 330 may grant a single time-bound role for each entitlement in which the user has rights. At line 727, the management interface 314 may log the assignment of the user entitlement using the audit trail module 318. The administrator 330 uses the management interface 314 to mint a user token at line 731, for storage in the entitlement database 322. The user token creation is logged via the audit trail module 318, at line 735.

At line 739, the administrator 330 may monitor for needed updates to the user entitlement assignments (e.g., due to promotion of employees, users leaving the company, etc.). When an update is needed, the administrator 330 may use the management interface 314 to update user profiles and remake user tokens in the entitlement database 322, at line 743. At line 747, the update to the user entitlement assignment is logged via the audit trail module 318.

Verification and Query

Figure 8:
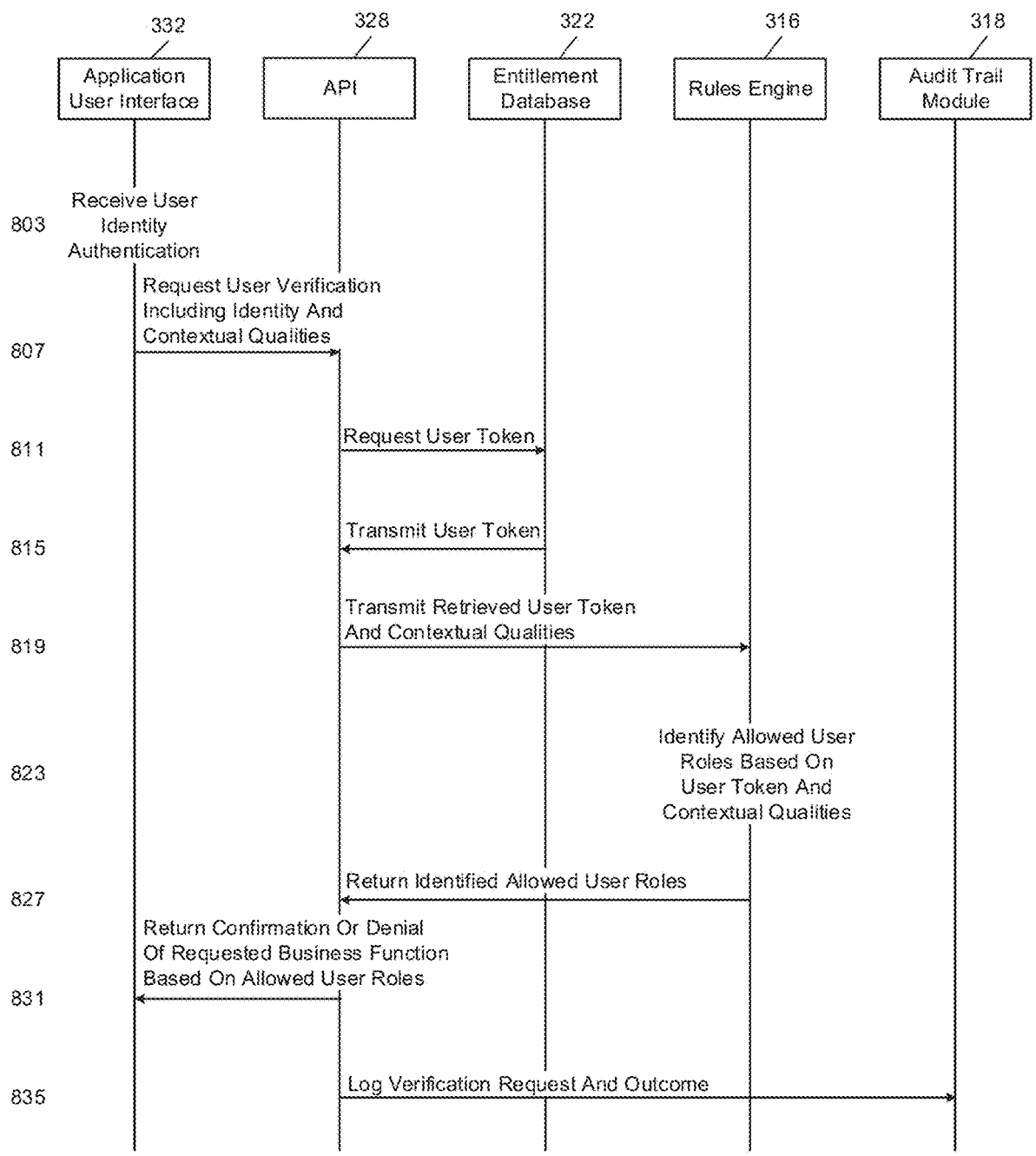
FIG. 8 is a message sequence chart showing example interactions between components of the system of FIG. 3 for verifying a computer user usage request based on user entitlements.

In FIG. 8, interactions between the application user interface 332, the API 328, the entitlement database 322 and the rules engine 316 are illustrated, during the process of verifying a user requesting access to a computer system. At line 803, the application user interface 332 receives user identity authentication information from a user, such as the human user 336 or the computer system user 338, and qualities of the current login context (e.g., location, environment, data classification, etc.). In response to receiving the user identity authentication credentials, the application user interface 332 requests user verification to the API 328, at line 807. For example, authenticated users may be verified to perform business functions based on their credentials defined in the entitlement system 300. Verification may occur at run time, via a request received directly from a computer system user 338, or received from the application user interface 332 as accessed by a human user 336 or a computer system 338. The verification request, including user identification and qualities of the current login context, may be sent to the application programming interface 328.

In response to receiving the user verification request, the API 328 requests a user token from the entitlement database 322, at line 811. The entitlement database 322 retrieves the applicable user token 326 based on the user credentials included in the request, and transmits the user token to the API 328 at line 815. At line 819, the API 328 transmits the user token 326 and the contextual qualities to the rules engine 316, and the rules engine 316 identifies allowed user roles based on the user token and the contextual qualities of the user's request at 823. For example, the rules engine may attempt to match the contextual qualities of the request with active user credentials indicated by the user token 326. More particularly, contextual qualities may be matched to entitlement quality sets that include qualities and their specific value indicated in the access request. The results of the match may be returned to the API 328, at line 827. If a match is identified, a confirmation that the user has been granted the requested credential may be returned to the application interface 332, at line 831. If a match is not identified, a denial response that the user does not have the appropriate credentials may be returned to the application user interface 332. The request and the outcome may be logged in the audit trail 314, at 835.

A match may be defined as an exact equal comparison of contextual qualities and values in the access request from the user, with an entitlement quality sets (qualities and their specified values). If a superset of the textual qualities is matched to an entitlement (e.g., the request includes more qualities than are defined in the entitlement), the qualities that are not defined in the entitlement may be ignored during the matching process, essentially implementing a filter. If the request includes only a subset of the qualities of the entitlement, the process may declare the comparison unmatched because not all entitlement qualities are present in the comparison.

Requesting a full set of user credentials, by providing the user identity to the entitlement database 322 to obtain the user token 326, may be advantageous when the user is attempting to perform multiple actions. The application user interface 332 may make a one-time request for the user's full set of credentials, and then verify rights locally rather than making multiple verification requests during a user session.

Figure 9:
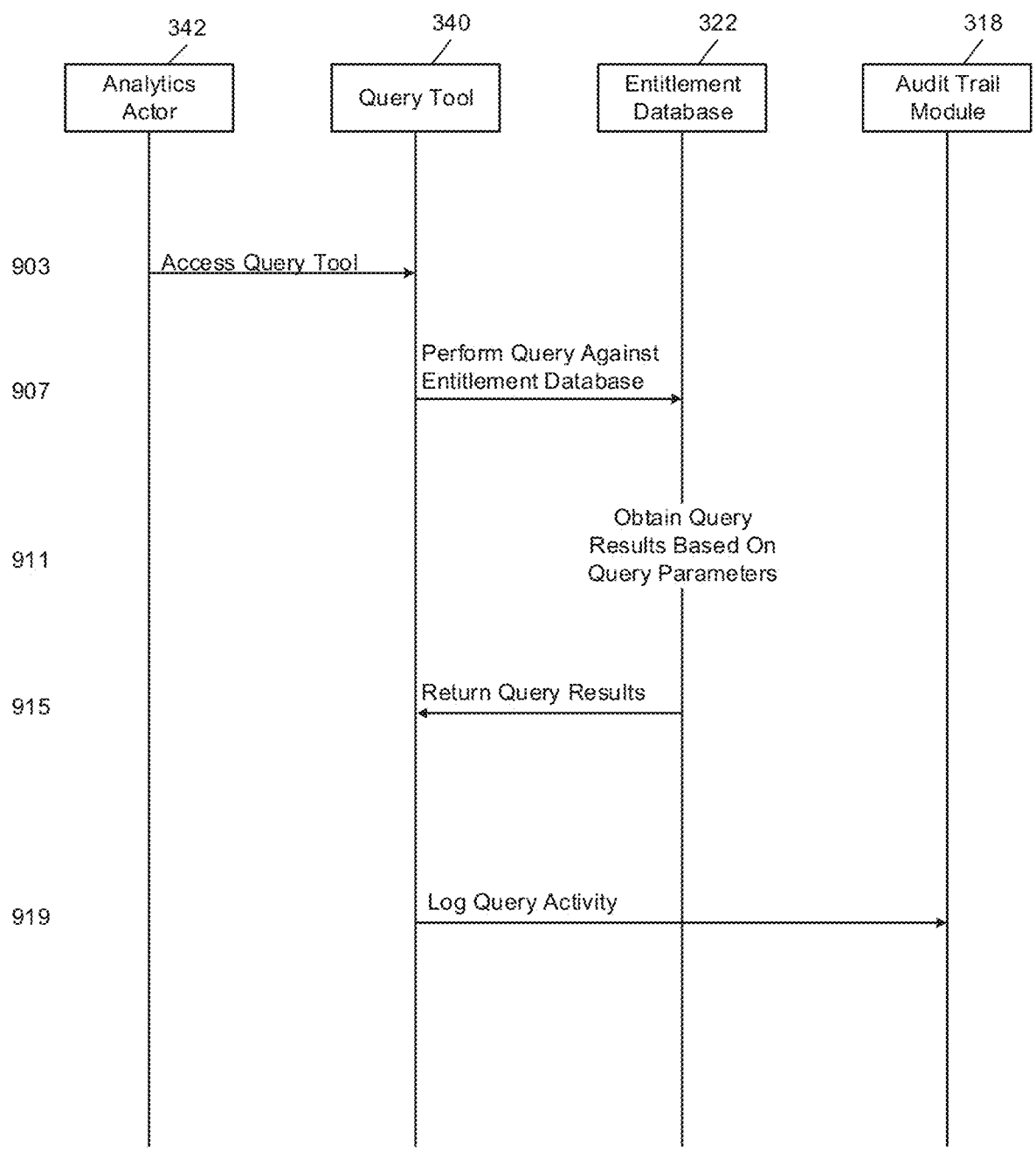
FIG. 9 is a message sequence chart showing example interactions between components of the system of FIG. 3 for querying analytics of the system.

In FIG. 9, interactions between the analytics actor 342, the query tool 340, the entitlement database 322 and the rules engine 316 are illustrated, during the process of querying the entitlement database 322 for information about stored data. As shown in FIG. 9, the analytics actor 342 accesses the query tool 340, at line 903. At line 907, the analytics actor 342 uses the query tool 340 to perform a query against the entitlement database 322.

The entitlement database 322 obtains query results based on query parameters in the query search, at line 911. For example, the query parameters may include any suitable search in the entitlement database 322, such as entitlements assigned to a specific user, a list of users registered to a specific entitlement, a list of all possible entitlements for assignment, etc.

At line 915, the entitlement database 322 returns the search query results to the query tool 340, where the results may be reviewed by the analytics actor 342. For example, the results could be returned as a visual representation on a user interface display, as a compiled report, etc. At line 919, the query tool 340 optionally logs query activity using the audit trail module 318.

Figure 10:
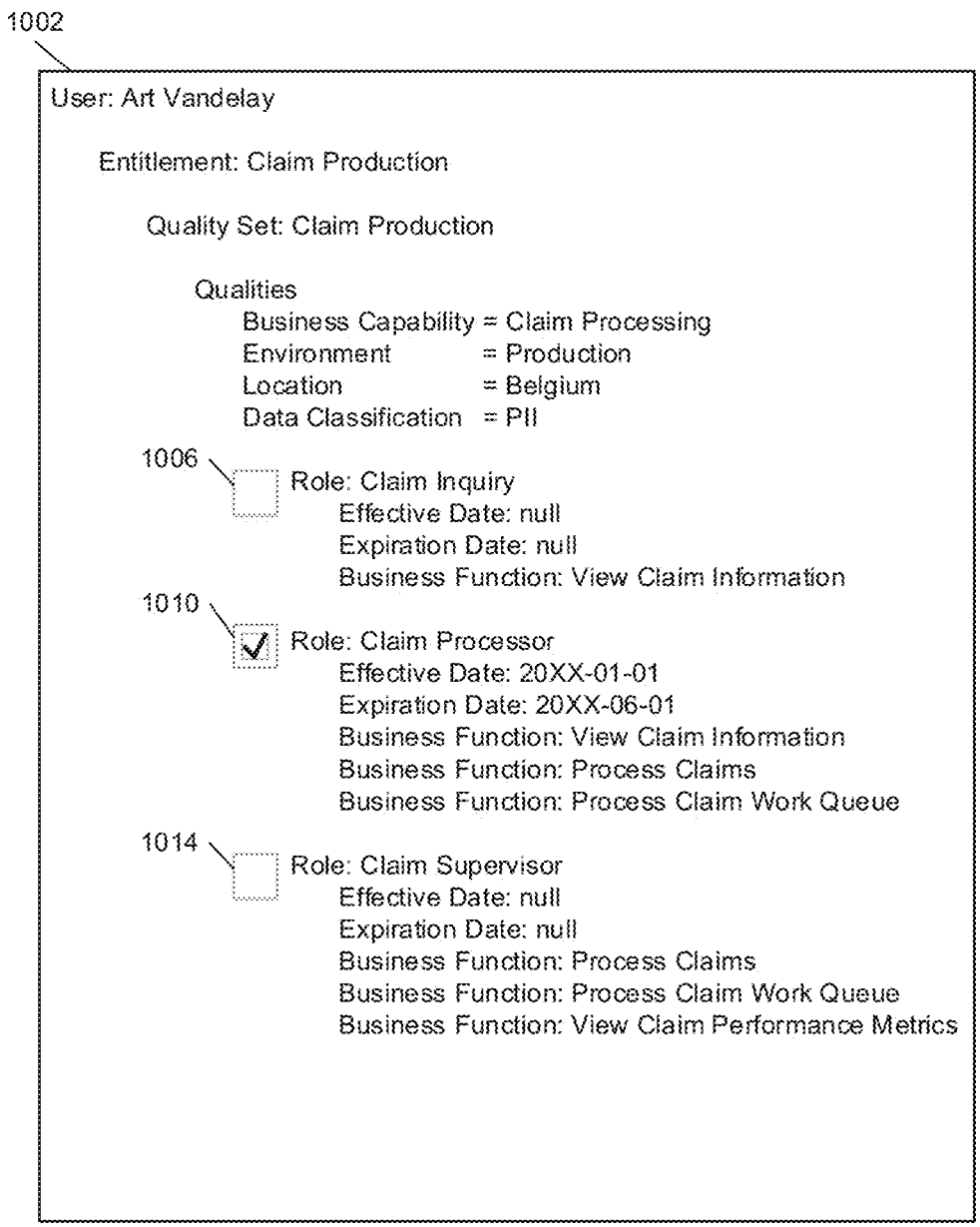
FIG. 10 is an example entitlement screen describing entitlements for a specific user.

FIG. 10 is an example entitlement screen 1002 for a user, such as a user profile 324 in FIG. 3. As shown in FIG. 10, for a user named Art Vandalay, the entitlement screen 1002 includes a claim production entitlement corresponding to a claim production quality set. The qualities include a claim processing business capability, a production environment, a location in Belgium and a PII data classification. In some implementations, an administrator may be able to view a token that identifies entitlements assigned to a specific user, a template that identifies possible entitlements that may be assigned to users, etc.

There are three roles illustrated, defined as a claim inquiry role, a claim processor role, and a claim supervisor role. The administrator 330 may use the checkboxes 1006, 1010, and 1014 to activate a role for the user. Each role has a specified effective date and expiration date, which may be adjusted by the system administrator 330, and each role lists business functions that the user is permitted to execute when the role is active.

For example, when the claim inquiry role 1006 is active, the user may 'View Claim Information'. The claim processor role 1010 includes the additional business functions of 'Process Claims' and 'Process Claim Work Queue.' The claim supervisor role 1014 provides a further business function of 'View Claim Performance Metrics.' Therefore, the user may be granted rights and privileges to different business functions depending on the roles of the entitlements that are active for the user.

FIG. 11 illustrates example pseudocode for a user token 1104, which may be similar to the user token 326 of FIG. 3. As shown in FIG. 11, the user token 1104 specifies the entitlement name and quality set name that are active for the user. Each quality includes the name and is stored value. In the user token 1104, the user role name, effective date and expiration date are specified, as well as the names of the various business functions that are permitted when the role is active.

As one example scenario of a data residency use case, for a particular customer claim, a country of origin such as Belgium may impose a data residency legal or regulatory requirement stating that PII data must reside at all times within the country. An insurance company ABC resides in and processes claims in the country of origin. During the claims process, data is stored locally on company laptops. An employee, Art Vandalay of the company ABC, has been granted an entitlement to process PII claim data in a production environment.

The employee is located out of the country of origin and attempts to process the claim. The employee's authenticated request is directed to the entitlement system for verification. The system determines, using contextual qualities including the physical location of the user, that the user is not entitled to process this particular claim due to data residency constraints reflected in the 'location' quality of the entitlement system quality set. The employee request to process the claim is then denied, because the contextual qualities of the request do not include the Belgian location that is required by the quality set of the requested entitlement.

As another example, in a microservice use case, data services may include orchestration and microservices such as fine-grained application services of the business function level. The microservice catalog may include a database that maps the micro services and business functions. An operational data store (ODS) may include a read-only centralized data store for operational reporting. Operational data store access may include authentication and authorization by matching user profile roles, wherein an ODS data view is a microservice view of underlying data, and the data structure includes physical data modelled as logical business objects.

In an example successful runtime flow, the user profile is created in the user entitlement system (UES) during set up and the user token is minted. The microservice catalog entries are created to map business functions to a microservice, and the microservice is created to fulfill the business function inquiry. An ODS user account is named to match the UES user role, and an operational data store data view is created to fulfill the microservice request. Operational data store data view privileges are granted to the user account.

During runtime the user issues an inquiry to a data services orchestration service, and the data services orchestration service authenticates the user and retrieves a user token from the user entitlement system. The user entitlement system logs the event and associated context qualities using the user audit trail module. The data services orchestration service identifies the user role from the user token entitlements for the requested user based on contextual runtime qualities, and determines the user is qualified for the request. The data service orchestration service retrieves a microservice mapped to the requested business function from the data service catalog, and a microservice is deemed available. The data service orchestration service coordinates the execution of the microservice on behalf of the user by authenticating to the operational data store using the user role as a proxy, and the data services microservice executes an operational data store data view to query data. Data results from the operational data store data view are returned to the user's inquiry via the data service.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computer system comprising:
memory hardware configured to store a credential database and computer-executable instructions; and
processor hardware configured to execute instructions, wherein the instructions include:
receiving, from a user device, a user verification request, wherein the user verification request includes:
user identity credentials,
a login context that specifies a location of a login event, and
a request for access to a computer system object;
determining whether the user identity credentials are verified; and
in response to determining that the user identity credentials are verified:
requesting, from the credential database, a user token based on the user identity credentials and the login context, wherein the user token specifies entitlements associated with the user identity credentials;
sending the user token to a rules engine;
determining, at the rules engine, whether the user token specifies entitlements sufficient to access the computer system object; and
in response to determining that the user token specifies entitlements sufficient to access the computer system object, permitting access to the computer system object.

2. The computer system of claim 1 wherein the rules engine determines whether the user token contains attributes required to access the computer system object by comparing the login context of the user verification request to contextual information required for access to the computer system object.

3. The computer system of claim 1 wherein the location indicates a physical location of the user device.

4. The computer system of claim 1 wherein the instructions include, in response to determining that the user token does not contain entitlements required to access the computer system object, denying access to the computer system object.

5. The computer system of claim 1 wherein the credential database includes a plurality of entitlement attribute sets that associate function privileges with user profiles.

6. The computer system of claim 5 wherein:
the credential database includes multiple user tokens each associated with at least one user; and
each user token specifies one or more of the function privileges granted to the user profile associated with the user token.

7. The computer system of claim 5 further comprising:
a management interface that is in communication with the credential database,
wherein the entitlement attribute sets and the user profiles are received from an administrator via the management interface.

8. The computer system of claim 7 wherein the instructions include:
modifying one of the entitlement attribute sets in response to a modification instruction received from the administrator via the management interface; and
deleting one of the user profiles in response to a deletion instruction received from the administrator via the management interface.

9. The computer system of claim 8 further comprising:
an audit trail module,
wherein the instructions include logging, via the audit trail module, at least one of:
the user verification request;
the determination of whether the user token contains attributes required to access the computer system object;
a query to the credential database;
modification of one of the entitlement attribute sets in the credential database; and
deletion of one of the user profiles.

10. The computer system of claim 5 further comprising a query tool in communication with the credential database, wherein the instructions include:
receiving one or more query parameters from an analytics actor via the query tool;
searching the credential database for user profile information corresponding to the one or more query parameters; and
returning results of the search to the query tool.

11. The computer system of claim 5 further comprising:
an application user interface; and
an application programming interface (API) in communication between the application user interface and the credential database,
wherein the API receives the request for access to the computer system object via the application user interface and returns a result of the request for access to the computer system object to the application user interface.

12. A method comprising:
receiving, from a user device, a user verification request, wherein the user verification request includes:
user identity credentials,
a login context that specifies a location of a login event, and
a request for access to a computer system object;
determining whether the user identity credentials are verified; and
in response to determining that the user identity credentials are verified:
requesting, from a credential database, a user token based on the user identity credentials and the login context, wherein the user token specifies entitlements associated with the user identity credentials;
sending the user token to a rules engine;
determining, at the rules engine, whether the user token specifies entitlements sufficient to access the computer system object; and
in response to determining that the user token specifies entitlements sufficient to access the computer system object, permitting access to the computer system object.

13. The method of claim 12 wherein the rules engine determines whether the user token contains attributes required to access the computer system object by comparing the login context of the user verification request to contextual information required for access to the computer system object.

14. The method of claim 12 wherein the location indicates a physical location of the user device.

15. The method of claim 12 further comprising, in response to determining that the user token does not contain entitlements required to access the computer system object, denying access to the computer system object.

16. A non-transitory computer-readable medium comprising instructions including:
- receiving, from a user device, a user verification request, wherein the user verification request includes:
  - user identity credentials,
  - a login context that specifies a location of a login event, and
  - a request for access to a computer system object;
- determining whether the user identity credentials are verified; and
- in response to determining that the user identity credentials are verified:
  - requesting, from a credential database, a user token based on the user identity credentials and the login context, wherein the user token specifies entitlements associated with the user identity credentials;
  - sending the user token to a rules engine;
  - determining, at the rules engine, whether the user token specifies entitlements sufficient to access the computer system object; and
  - in response to determining that the user token specifies entitlements sufficient to access the computer system object, permitting access to the computer system object.

17. The non-transitory computer-readable medium of claim 16 wherein:
- the rules engine determines whether the user token contains attributes required to access the computer system object by comparing the login context of the user verification request to contextual information required for access to the computer system object; and
- the location indicates a physical location of the user device.

* * * * *